United States Patent
Spain et al.

(10) Patent No.: US 12,242,605 B2
(45) Date of Patent: Mar. 4, 2025

(54) SCRIPT CLASSIFICATION ON COMPUTING PLATFORM

(71) Applicant: Google LLC, Mountain View, CA (US)

(72) Inventors: Merrielle Therese Spain, Kirkland, WA (US); Timothy Dylan Peacock, San Francisco, CA (US); John Edward Davis, Kirkland, WA (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 17/880,793

(22) Filed: Aug. 4, 2022

(65) Prior Publication Data
US 2023/0053322 A1 Feb. 16, 2023

Related U.S. Application Data

(60) Provisional application No. 63/230,455, filed on Aug. 6, 2021.

(51) Int. Cl.
*G06F 21/56* (2013.01)
*G06N 3/08* (2023.01)

(52) U.S. Cl.
CPC .......... *G06F 21/563* (2013.01); *G06N 3/08* (2013.01); *G06F 2221/033* (2013.01)

(58) Field of Classification Search
CPC .... G06F 21/563; G06F 2221/033; G06N 3/08
See application file for complete search history.

(56) References Cited

U.S. PATENT DOCUMENTS

| | | | | |
|---|---|---|---|---|
| 10,581,888 | B1* | 3/2020 | Agranonik | H04L 63/1466 |
| 10,878,095 | B2* | 12/2020 | Skvortsov | G06F 16/951 |
| 10,956,477 | B1 | 3/2021 | Fang et al. | |
| 11,341,265 | B1* | 5/2022 | Gunawardena | G06F 21/6245 |
| 2020/0134056 | A1 | 4/2020 | Sarkar | G06F 16/56 |
| 2021/0141897 | A1 | 5/2021 | Seifert et al. | |
| 2022/0179959 | A1* | 6/2022 | Silveira | G06F 21/57 |
| 2022/0350895 | A1* | 11/2022 | Agron | G06F 21/554 |
| 2022/0405529 | A1* | 12/2022 | Yurochkin | G06F 18/214 |
| 2023/0185840 | A1* | 6/2023 | Pancha | G06F 16/3347 707/708 |

OTHER PUBLICATIONS

Lexical Analysis. Wikipedia. Aug. 16, 2022. Retrieved from the Internet on Dec. 2, 2022: <https://en.wikipedia.org/w/index.php?title=Lexical_analysis&oldid=1029242439>. 9 pages.
Invitation to Pay Additional Fees for International Application No. PCT/US2022/039533 dated Nov. 17, 2022. 14 pages.

* cited by examiner

*Primary Examiner* — Ryan J Jakovac
(74) *Attorney, Agent, or Firm* — Lerner David LLP (57) ABSTRACT

Aspects of the disclosure are directed to a system for classifying software as malicious or benign based on predicting the effect the software has on the platform before the software is actually deployed. A system as described herein can operate in close to real-time to receive, isolate, and classify software as benign or malicious. Aspects of the disclosure provide for accurate classification of malicious programs or scripts even if ostensibly the program appears benign, and vice versa, based on the effect predicted by a machine learning model trained as described herein. The system can also be implemented to isolate and verify incoming scripts or software to the platform, to provide a predicted classification while not substantially impacting processing pipelines involving platform resources or the user experience with the platform in general.

1 Claim, 5 Drawing Sheets

SCRIPT CLASSIFICATION ON COMPUTING PLATFORM

CROSS-REFERENCE TO RELATED APPLICATIONS

This application claims the benefit of the filing date of U.S. Provisional Patent Application No. 63/230,455 filed Aug. 6, 2021, the disclosure of which is hereby incorporated herein by reference.

BACKGROUND

Machine learning models can be trained to perform classification tasks for identifying which class or classes a given input belongs to. In some cases, the machine learning model receives a preset list of classes, while in other cases the model may be trained to identify classes and place input of similar qualities into one or more of the identified classes. Classification tasks can range from identifying whether an input belongs to a single class or not, to identifying whether an input belongs to one or more of multiple classes, and with variations in-between.

A computing platform is a collection of computing resources, such as processors, specialized hardware, and/or memory, which can be made available over a network to provide computing services. A computing platform can provide services according to different paradigms, including: Infrastructure-as-a-Service (IasS); platform-as-a-service (PasS) and software-as-a-service (SasS). One problem in managing a computing platform is protecting the platform from malicious activity, such as preventing the execution of malicious scripts or other forms of software on platform resources. Malicious scripts can diminish or disable some or all of the services of a computing platform, and can also be a significant threat to data processed and stored on the platform.

BRIEF SUMMARY

Aspects of the disclosure are directed to a system for classifying software as malicious or benign based on predicting the effect the software has on the platform before the software is actually deployed. A system as described herein can operate in close to real-time to receive, isolate, and classify software as benign or malicious. The system can also be implemented to isolate and verify incoming scripts or software to the platform, to provide a predicted classification while not substantially impacting processing pipelines involving platform resources or the user experience with the platform in general. Results of the classification can be promptly displayed or sent to computing devices of users who may be affected by the thwarted execution of malicious software. The system can be scaled as additional computing resources are allocated to users of the platform, to provide malicious script classification on newly allocated computing nodes.

An aspect of the disclosure is directed to a system comprising: one or more processors in communication with a computing node of a computing platform, the one or more processors configured to: receive a script from the computing node; tokenize the script into a plurality of tokens; and generate an output classification of the script as benign or malicious to the computing platform, using a classification machine learning model trained to classify scripts; and send the output classification to the computing node.

The computing node can include a node watcher configured to monitor incoming traffic to the computing node for scripts, and to send scripts to the one or more processors.

The computing node is one of a plurality of computing nodes communicatively coupled to one another, and wherein each of the plurality of computing nodes comprises a respective node watcher configured to monitor incoming traffic to the computing node for scripts, and to send scripts to the one or more processors.

The node watcher is further configured to: receive the output classification from the one or more processors, and send a response comprising the output classification to the computing node.

The one or more processors are further configured to send, to the computing node, one or more of: a name of the classified script, a hash digest of at least a first portion of the classified script, and at least a second portion of the classified script.

The computing node is a virtual machine, and wherein the node watcher is implemented in the user space of the virtual machine.

The node watcher is a kubernetes daemonset.

In receiving the script, the one or more processors are configured to: identify an incoming function call to the computing node comprising a file location of the script as a function argument; and obtain the script from the file location indicated in the function argument.

The system of claim 1, wherein the classification machine learning model comprises: an embedding model trained to map an input script to a corresponding embedding vector representation of the input script, a convolutional neural network configured to receive embeddings from the embedding model; and a feed-forward network configured to receive output from the convolutional neural network, the feed-forward network comprising one or more hidden layers and an output layer configured to generate an output classification for the input script.

The convolutional neural network comprises: at least one convolutional layer comprising 200 filters of size 2, at least one convolutional layer comprising 200 filters of size 3, at least one convolutional layer comprising 200 filters of size 4, and at least one convolutional layer comprising 200 filters of size 5.

The embedding model is trained using a corpus of training documents written in a language that is not a scripting language.

The one or more processors are further configured to train the classification machine learning model, wherein in training the classification machine learning model, the one or more processors are configured to: receive script training data comprising a plurality of training scripts; tokenize the plurality of training scripts to generate a plurality of tokens; for each training script, generate a respective integer vector of the training script comprising a plurality of elements, each element corresponding to a number of occurrences of respective one or more token or hashed tokens in the training script; generate a map between the generated integer vectors and a plurality of binary vectors, each binary vector comprising a plurality of binary elements, the map based on projecting the generated vectors into a dimension lower than a dimension for the generated integer vectors, while preserving respective similarity between the generated integer vectors when the generated integer vectors are compared using a distance function; generate one or more groups of connected binary vectors; generate, using the one or more groups of connected binary vectors, a training set, a validation set, and a testing set of training scripts, wherein for each group of binary vectors, training scripts corresponding to the group are either all in the training set, all in the validation set, or all in the testing set; and train the classification machine learning model to classify scripts using the generated training, validation, and testing sets.

The distance function is a cosine distance function.

In generating the one or more groups of connected binary vectors, the one or more processors are configured to: removing one or more binary vectors each mapped to only one respective integer vector; and identify one or more connected components defined by the plurality of binary vectors in the binary vector space after removing the one or more binary vectors.

To generate the respective integer vector, the one or more processors are configured to hash tokens of the training script using locality-sensitive hashing (LSH), wherein the elements of the respective integer vector are indexed by LSH values of the tokens of the training script.

In generating the training set, validation set, and the testing set, the one or more processors are configured to split: approximately 60 percent of the script training data to the training set, approximately 20 percent of the script training data to the validation set, and approximately 20 percent of the script training data to the testing set.

A method including performing, by one or more processors, the operations configured to be performed by the one or more processors as in any of the foregoing.

One or more non-transitory computer-readable storage media encoding instructions that are operable when performed by one or more processors to cause the one or more processors to perform the operations as in the method, above.

A method of training a machine learning model for script classification, comprising: receiving, by one or more processors, script training data comprising a plurality of training scripts; tokenizing, by the one or more processors, the plurality of training scripts to generate a plurality of tokens; for each training script, generating, by the one or more processors, a respective integer vector of the training script comprising a plurality of elements, each element corresponding to a number of occurrences of respective one or more tokens or hashed tokens in the training script; generating, by the one or more processors, a map between the generated integer vectors and a plurality of binary vectors, the map based on projecting the generated vectors into a dimension lower than a dimension for the generated integer vectors, while preserving respective similarity between the generated integer vectors when the generated integer vectors are compared using a distance function; generating, by the one or more processors, one or more groups of connected binary vectors; generating, by the one or more processors, using the one or more groups of connected binary vectors, a training set, a validation set, and a testing set of training scripts, wherein for each group of binary vectors, training scripts corresponding to the group are either all in the training set, all in the validation set, or all in the testing set; and training, by the one or more processors, the classification machine learning model to classify scripts using the generated training, validation, and testing sets.

A system comprising one or more processors configured to perform the method as in any one of the foregoing.

One or more non-transitory computer-readable storage media encoding instructions that are operable when performed by one or more processors to cause the one or more processors to perform operations including the method as in any one of the foregoing methods.

DETAILED DESCRIPTION

Overview

Aspects of the disclosure are directed to a system for classifying software scripts as benign or malicious before being executed on a computing platform.

A software script ("script") can be a collection of one or more programming statements written in a scripting or programming language. Scripts can be interpreted at runtime instead of being compiled, and can be used for automating processing tasks, for example by defining a sequence of steps to be performed by different computer programs. In other examples, scripts may also be compiled before execution. Although the description and examples provided herein refer to software scripts, it is understood that aspects of the disclosure can be implemented for classification on a variety of different types of documents, including scripts, binaries, software programs, and any type of computer-readable code.

The versatility of a script is helpful for writing ad-hoc programs to address smaller software development issues that may appear during development, but may not necessitate the use of a fully compiled program. Scripts can be quickly written and executed on the computing platform 120 to perform testing or debugging, or to automate certain tasks that would otherwise require manual input. Example scripting languages include Bash, PowerShell, and Python. Some languages, such as Bash, can be used on Unix and Unix-like operating environments, which furthers a Bash script's versatility even across different environments.

At least in part due to their versatility, software scripts are often used by adversaries to attack computing systems by exploiting known system vulnerabilities. These attacks can reduce or completely bring down computing resources of an affected computing system. Scripting attacks can also compromise data stored on the platform, for example by leaking the data and/or making the stored data corrupted, encrypted, and/or generally unworkable. Scripts that cause these attacks to occur when executed are referred to as "malicious." Scripts that are not malicious are "benign." Aspects of the disclosure provide for classifying malicious scripts from benign scripts before they are executed, and taking appropriate action to thwart a scripting attack before it occurs.

The system captures scripts at execution time for a node of the computing platform. A node is a collection of physical and/or virtual computing resources used to execute workloads on the platform through operating systems, guest operating systems, and/or application containers deployed on the node. Before execution, the system securely transmits the captured script from the node to the system backend. The system backend receives and processes the script through a classification engine.

The classification engine includes a machine learning model trained to classify the script as benign or malicious, according to aspects of the disclosure.

Although the classes described herein refer to two labels—"benign" or "malicious," it is understood that in other examples, different labels may be used to label classes according to the specification script classification task the script classification system is configured to perform. As described herein, "malicious" scripts include scripts that generally cause computing resources to be diminished or made unavailable, for any of a variety of reasons. In other examples, scripts can be classified based on more particular effects the scripts may have.

Scripts can be classified based on what the system predicts is the goal of the adversary behind the script. For instance, the script classification system may be configured to classify scripts as being part of a ransomware attack to the platform. In that example, a script may be classified as "ransomware attack script" or "not ransomware attack script," or similar labels. As another example, the script classification system can be configured to classify attempts to exploit computing resources for cryptocurrency mining.

In yet other examples, the script classification system can classify scripts based on a predicted quality of the adversary sourcing the script. For example, the script classification system may classify amateur attacks using known and propagated scripts (e.g., from "script kiddies"), versus scripts that are predicted to be from a more sophisticated or professional adversary.

Although the classification system is described as performing a binary classification, such as "malicious" or "benign," it is understood that the classification system can be configured for multi-class classification. For example, the classification system can classify a script as "malicious," and provide additional classification for a type of predicted malicious behavior—such as "ransomware attack" or "cryptocurrency mining attempt."

In some implementations, the classification engine can also be configured as a regression engine to predict attack severity among scripts classified as malicious. In those examples, the classification engine can implement an additional regression model, and is trained to output a value within a range from a lowest threat to a highest threat indicator. These predictions can also be provided to the platform security device, for example as part of downstream threat evaluation and mitigation of malicious script attacks.

After the classification engine generates an output classification, the results can be shared with the computing node and user computing devices authorized to receive the output classification, and any additional information related to the classified script. User computing devices can interact with the system, for example through a user interface or application-program interface (API), to receive output classifications generated by the classification engine.

The system can be deployed on a node-by-node basis on the platform. For example, multiple nodes may form a cluster on the computing platform, managed by a control plane. For each node, a node watcher can process incoming data to the node to identify new scripts about to be executed on the node. The node watcher securely transmits the script to the system backend, which can be part of a larger system of the platform for orchestrating the creation of allocating and maintaining different clusters of nodes between users of the computing platform. The system backend sends the script to the classification engine, and receives an output classification from the classification engine. The system backend replies to the node watcher with the output classification. The node watcher can send a prompt with the response to one or more user computing devices in communication with the node, and/or to other nodes and the control plane, to alert the other nodes of the attempted execution of a malicious script.

Aspects of the disclosure include systems for training machine learning models to more accurately classify software scripts. Data leakage in training machine learning models occurs when information, for example information that is irrelevant to the task, (irrelevant to the task) is provided to a machine learning model during training that would not be expected to be provided when the model runs at inference. An example of data leakage is providing training examples from a training set, to a testing set. This may occur when training data includes a number of duplicate or near-duplicate training examples, which are split across a training set, validation set, and testing set. The accuracy of the model based on its performance in processing the data-leaked testing set can be overestimated, at least because the model was provided with examples during training that then appeared again during testing, as opposed to evaluating the model on completely new input. This makes validation function improperly, so the model can be trained too much, which reduces accuracy on completely new input. The incorrect validation can also mislead the practitioner into selecting models that are too complex, which further reduces accuracy on completely new input. For classification models trained to perform script classification as described herein, scripts provided for training can be the same or very similar within a corpus of training data. For example, some scripts may vary only at one or two places, such as different passwords between otherwise identical scripts.

Aspects of the disclosure include a training system for splitting a corpus of training data into training, validation, and testing sets, by mapping training scripts to a binary vector space and identifying connected components in that space. By training a classification model using data split using the processes described herein, data leakage can be reduced at least because the probability of identical or near-identical examples appearing across the training, validation, and testing sets are reduced. By reducing data leakage, model performance can improve by making the resulting model more accurate and less likely to overfit. A system as described herein can use the improved classification model to more accurately classify malicious scripts, which can improve corrective action taken by the platform to mitigate platform downtime or damage.

Aspects of the disclosure provide for the following technical advantages: the system as described herein can be implemented with individual node watchers in the background of each node in a cluster of computing resources, allowing independent detection, classification, and response for each node without disrupting operations of the cluster as a whole. In other words, script attacks can be handled locally to the affected node, without affecting resource up-time for other nodes, therefore improving performance of the computing platform as a whole. Accurate identification and response to malicious scripts also improves computing resource utilization, at least because successful attacks are reduced, which would otherwise reduce or eliminate computing platform services to users relying on the platform for infrastructure, software and/or platform support.

For example, a script classification system as described herein can intercept and classify malicious scripts related to attempts to hijack computing resources by outside adversaries, for example to mine cryptocurrency. Successful attack reduction according to aspects of the disclosure can also improve the platform's functionality as a secure repository for data, at least because the reduced risk of successful attacks also reduces the likelihood data on the platform is compromised or corrupted. For example, the script classification system can classify malicious scripts related to ransomware attacks.

The system can be efficiently scaled out, at least because newly allocated nodes can be initialized for script detection with computationally lightweight node watchers configured to direct incoming scripts to a central backend. The system does not need to wrap a script detection mechanism around a script execution software installed locally on a computing device, unlike other approaches.

Example Systems

Figure 1:
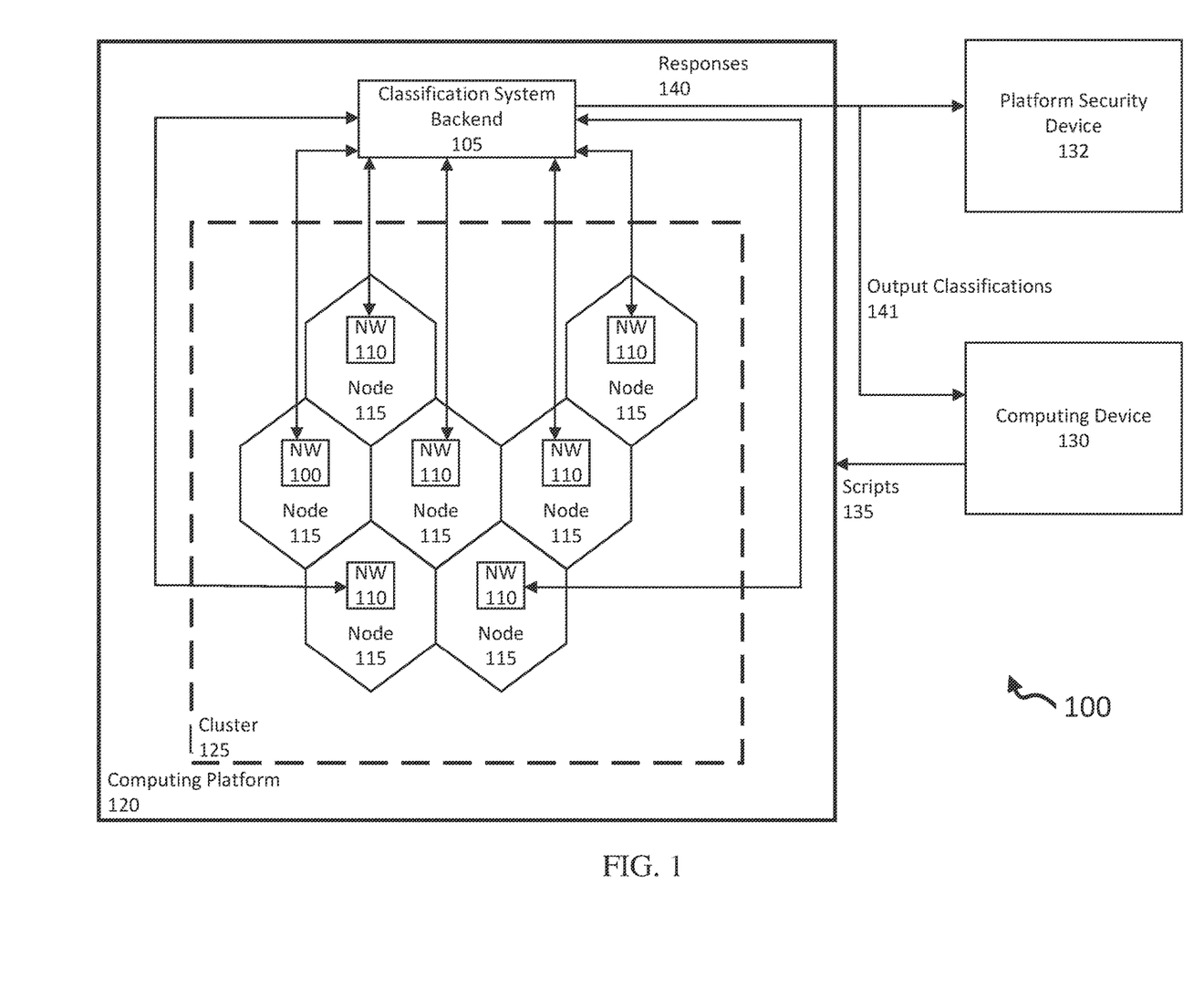
FIG. 1 is a block diagram of a script classification system, according to aspects of the disclosure.

FIG. 1 is a block diagram of a script classification system 100, according to aspects of the disclosure. The system includes a classification system backend 105 and node watchers (NW) 110. A computing node 115 ("node 115") is a discrete unit of computing resources. The node 115 can include a combination of physical and/or virtual computing resources. The node 115 can include one or more processors, which may be reserved for the node 115 or shared with other nodes of a computing platform 120. The node 115 can also include one or more memory devices, which may also be reserved or shared with the other nodes of the platform 120. Nodes of the platform 120 can also include virtualized resources, including one or more virtual machines.

The node 115 can interact with one or more other nodes, and/or other computing devices over a network, such as the Internet. Malicious scripts may be received by the node 115 from a computing device controlled by an adversary. Computing device 130 in some examples can be an adversarial computing device, for example when malicious scripts are sent. The computing device 230 in some examples can represent a user computing device of a user associated with the node 115 or its corresponding cluster. In those examples, the scripts 135 may be benign and classified as-such by the system 100.

Figure 2:
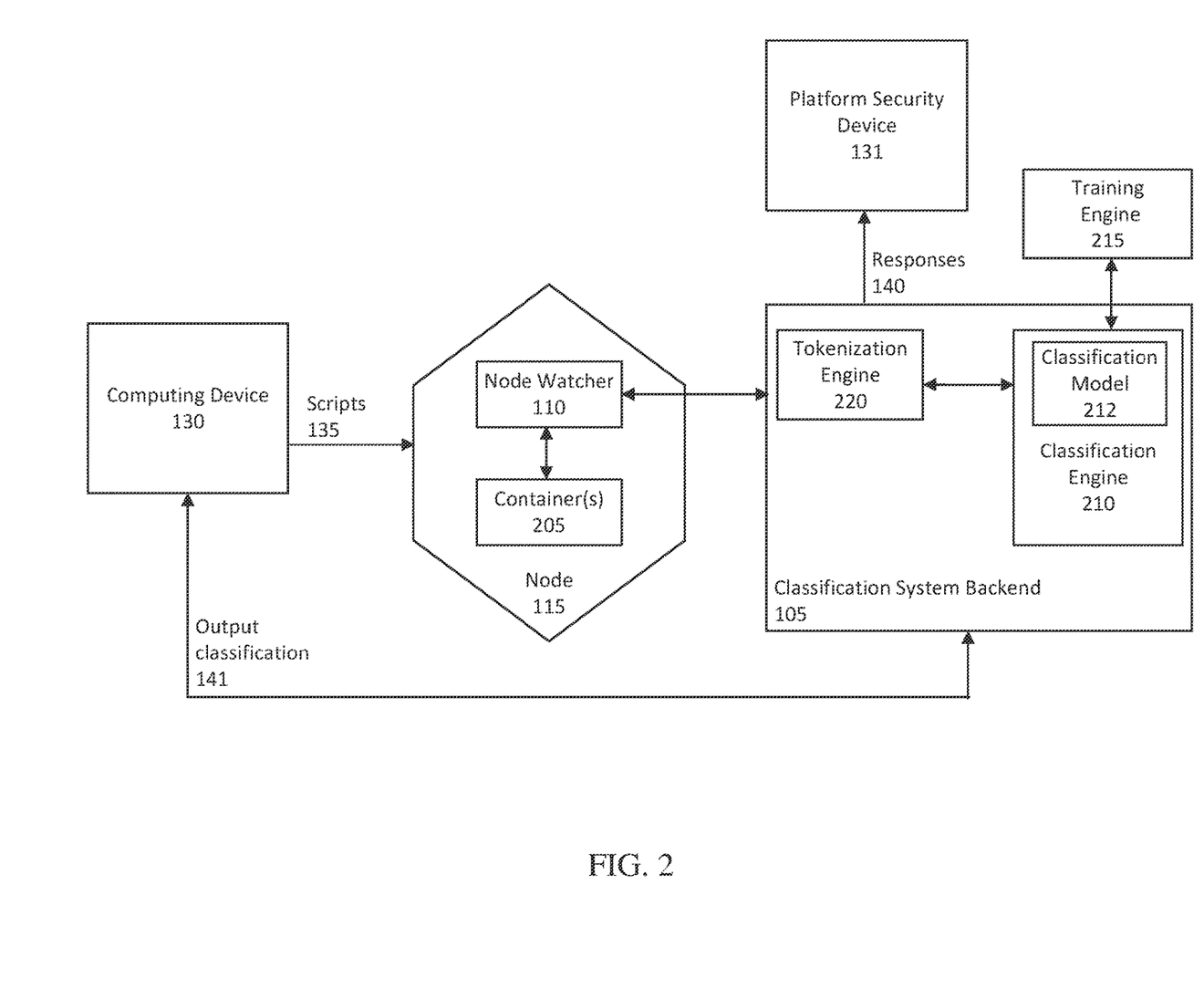
FIG. 2 is a block diagram of a node communicating between a user computing device and a classification system backend.

As shown in FIG. 2, computing resources on a node can be subdivided, for example using one or more application container(s) 205 for executing workloads on the node. Workloads can include software applications, software scripts, and software services, each of which can be configured to interact with other nodes and/or with other devices for receiving input and sending output corresponding to the executed workload.

Nodes of the platform 120 can be coupled to one or more volumes of storage devices, which can store data accessed by the nodes to execute their respective applications or services. Although only the one or more containers 205 are shown in FIG. 2, it is understood that a node of the computing platform 120 can be logically organized according to a variety of processing paradigms, including virtual machines running applications, containers running applications, or bare-metal server hardware running an operating system that in turn executes one or more workloads.

Nodes can be grouped together to form clusters, such as cluster 125, indicated by the dashed box around the nodes 115. Although not shown, one or more of the nodes in the cluster 125 can be leader nodes, configured to perform operations related to maintaining the cluster 125. These operations can include receiving input, adding or removing nodes to the cluster 125, and/or assigning different workloads to each node. Workload assignment can also include applying any of a variety of processes for load-balancing workloads across the cluster 125.

Clusters or individual nodes can be assigned to users of the computing platform 120, and communicated using one or more user computing devices, such as computing device 130. The user computing device 130 can be associated with a user platform account authorized to access the cluster 125, for example to make changes to the composition of the cluster, and/or to change the workloads executed on the cluster 125 and related parameters. The computing device 130 can communicate with the platform 120 over one or more networks, and using any of a variety of interfaces, such as a web interface and/or an application programming interface (API).

Data communicated between the computing device 130 and the platform 120 can include one or more scripts 135 and output classifications 141 indicating whether the script(s) 135 were identified as malicious or benign by the script classification system 100. As described in more detail herein, the node watchers 110 receive the scripts 135, send the scripts 135 to the classification system backend 105, and receive a response from the backend 105 indicating whether the sent scripts are benign or malicious.

In addition to the output classification 141, responses 140 can be sent to a platform security device 132. The responses 140 can also include other information, such as the name of the classified script, the hash digest of the classified script or part of the script, and the classified script or at least part of the script. This additional information can be provided to the platform security device 132 and used in downstream processing for preventing execution of the script or identifying the source of the script.

In the event of classifying a malicious script, the system backend can also send the output classification to the affected node or nodes of the cluster 125. In turn, the nodes can be configured to take action to prevent execution of the script, and/or take other action to isolate from other unaffected nodes, as necessary.

FIG. 2 is a block diagram of a node 115 communicating between a computing device 130 and a classification system backend 105. The node watcher 110 can monitor incoming traffic for scripts to be executed on the node, for example on containers 205. The node watcher 110 itself can be implemented in a user space of the node 115, for example when the node 115 is a virtual machine. The node watcher 110 can be implemented on one or more containers, in some examples. In some examples, the node watcher 110 is implemented as a kubernetes daemonset.

The classification system backend 105 includes a tokenization engine 220, a classification engine 210, and can be communicatively coupled with a training engine 215. The training engine 215 can be part of the script classification system 100, or be an independent component of the computing platform 120 or another system. The classification engine 210 can include a classification machine learning model 212.

Upon identifying a script 135 to the node 115, the node watcher 110 can send the script 135 to the classification system backend 105 for processing. The script 135 is sent ephemerally and is not stored in persistent memory in the classification system backend 105. After the script 135 is processed, the classification system backend 105 sends an output classification and other information, and discards the script 135. In some examples, the node watcher 110 can identify incoming function calls, such as through an API, to the node 115 that include a script, or a file location of a script, as a function argument. In those examples, the node watcher 110 can be configured to retrieve the script at its file location, and send the script to the classification system backend 105.

The tokenization engine 220 can receive the script 135, and tokenize the script to generate a plurality of tokens. The tokenization engine 220 can also be configured to preprocess the script 135 to prepare it to be received as input by the classification engine 210. This preprocessing may include formatting the script to a format the classification model 212 is trained to receive to generate an output classification.

Figure 4:
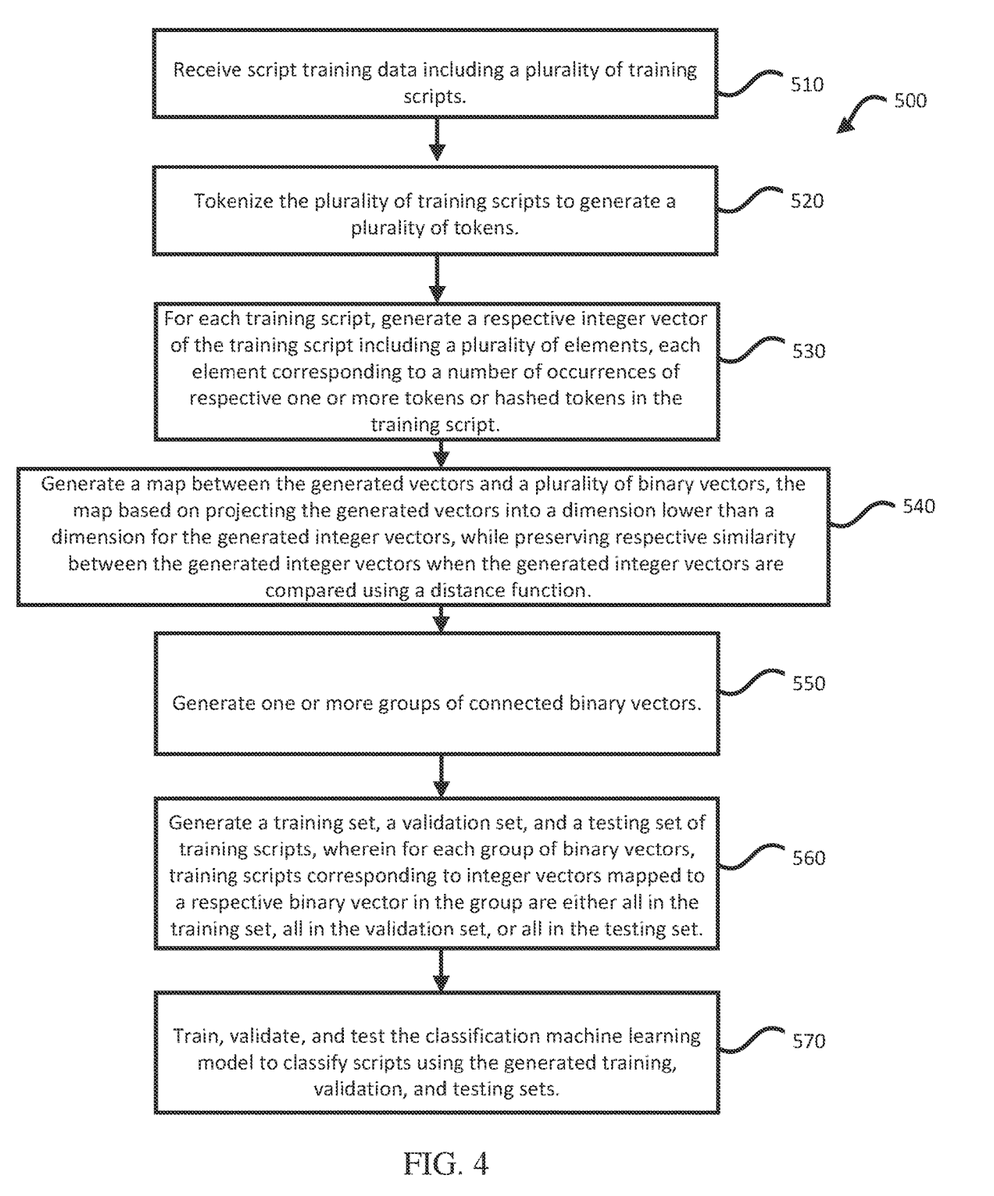
FIG. 4 is a flow chart of an example process for training a script classification machine learning model, according to aspects of the disclosure.

The classification machine learning model 212 can be trained by the training engine 215 to perform script classification. FIG. 4 illustrates an example process 500 for training the classification model 212. The classification model 212 can receive a tokenized and preprocessed script, as input, and generate an output classification, as output. The output classification can be a floating-point value between zero and one, with a value of zero indicating benign and a value of one indicating malicious (or vice-versa). Output classifications between zero and one can represent a predicted probability that the input script is malicious or benign, and in some examples the model 212 can round up or round down the output classification according to predetermined cut-offs.

In some examples, the classification model 212 can include an embedding model, a convolutional neural network, and a feed-forward network. The embedding model can be trained to map an input script to a corresponding embedding of the input script. An embedding can be a vector representation of a given input, for example an input script. For example, the embedding model can be trained to generate a 100-dimension embedding for each received script. It has been observed that embedding models trained on a corpus of text documents in a language other than a scripting language can perform better than embedding models trained on a corpus of scripts. For example, the embedding model can be trained on news snippets in English, and be used to generate embeddings for Bash scripts.

Following the embedding model, the convolutional neural network can receive and process the generated embeddings. The convolutional neural network can include multiple convolutional layers. At least one layer can include 200 filters of size 2. Another layer can include 200 filters of size 3. Another layer can include 200 filters of size 4. Another layer can include 200 filters of size 5, although the exact number and size of the filters can vary from implementation-to-implementation.

The output of the convolutional neural network can be fed into a feed-forward network, including multiple hidden layers of 100 nodes, and an output layer. The feed-forward network can receive the filter responses from the convolutional neural network and generate an output classification, which can be sent back to the node watcher 115.

Example Methods

Figure 3:
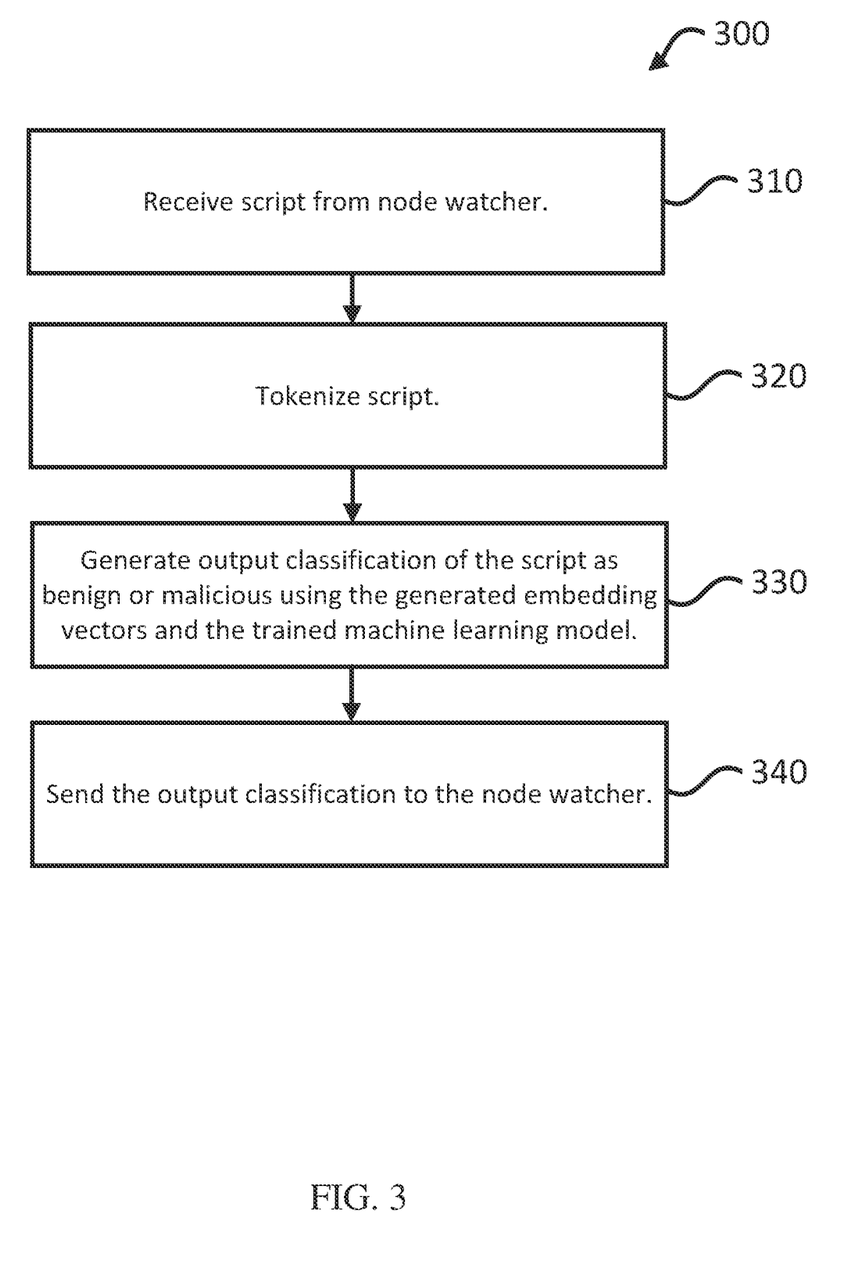
FIG. 3 is a flow chart of an example process for classifying a script, according to aspects of the disclosure.

FIG. 3 is a flow chart of an example process 300 for classifying a script, according to aspects of the disclosure.

The script classification system receives a script from a node watcher, according to block 310. The node watcher can receive the script by monitoring incoming traffic to a node, and/or by retrieving the script at a file location specified as a function argument in a function call to the node.

The script classification system tokenizes the script, according to block 320. The system can tokenize the script according to any one of a variety of different tokenization processes. For example and depending on the script language, the system can delimit tokens by whitespace in the script. Other delimiters may be predefined and used, in addition or as an alternative to whitespaces. In some examples, the system can remove some or all comments.

TABLE 1 as shown below is an example of a script received for tokenizing by the tokenizer engine.

TABLE 1

| | |
|---|---|
| 1 | #!/bin/sh |
| 2 | |
| 3 | mkdir project |
| 4 | cd project |
| 5 | for benchmark in cutcp histo mm sad spmv |
| 6 | do |
| 7 | mkdir $benchmark |
| 8 | cd $benchmark |
| 9 | # ln –s |

The output tokens are: mkdir, project, cd, project, for, benchmark, in, cutcp, histo, mm, sad, spmv, do, mkdir, $benchmark, cd, $benchmark. Comments are identified based on the script language and ignored.

The script classification system generates an output classification of the script as benign or malicious using the generated embedding vectors and the trained machine learning model, according to block 330. The trained machine learning model can be the classification model 212, for example. The trained machine learning model can be trained according to the process 500 described herein with reference to FIG. 4.

The script classification system sends the output classification to the node watcher, according to block 350. The script classification system can also send other information related to the script, to a platform security device, including the output classification. In turn, the node watcher can send information to the node, and/or user computing devices in communication with the node and authorized to receive the information.

FIG. 4 is a flow chart of an example process 500 for training a script classification machine learning model, according to aspects of the disclosure. As described herein, the classification engine 210 can be trained by the training engine 215, which can be part of the script classification system, or be a component separate from the system. As part of training the classification engine 210, the training engine 215 can receive a corpus of labeled training scripts, and generate a respective training, validation, and testing set from the corpus, based on processing binary vectors mapped to vectorized training scripts, thereby reducing data leakage and improving model performance. For example, the training engine 215 can perform the process 500, described presently.

The training engine receives script training data including a plurality of training scripts, according to block 510. The script training data can be a corpus or collection of training scripts. A training script is a labeled script—the label may correspond to whether the training script is malicious or benign. Training scripts may not be tied to the identities of platform users. Script training data and individual training scripts are not identifiable to a specific user. Once trained, the model does not provide information related to a user.

Further to the description herein, a platform user may be provided with controls allowing the user to make an election as to both if and when systems, programs, or features described herein may enable collection of user information, for example scripts written by the user or scripts including user information, and if the user is sent content or communications from a server.

In addition, certain data, such as the training scripts, may be treated in one or more ways before it is stored or used, so that personally identifiable information is removed. For example, training scripts may be treated so that no personally identifiable information can be determined for the user. Thus, the user may have control over what information is collected about the user, how that information is used, and what information is provided to the user.

The training scripts can be labeled based on effects the script had or would have if executed on the platform. Scripts can be executed in a sandbox or other virtual environment and their effects of execution can be manually or automatically labeled as malicious or benign. Other scripts can be labeled after review of platform logs or other information describing activity following execution of the scripts, as either malicious or benign. Other scripts can be manually reviewed and labeled based on the review as malicious or benign. The scripts can be accessed from publicly available databases, and in general are unrelated to users of the computing platform.

The training engine tokenizes the plurality of training scripts to generate a plurality of tokens for each script, according to block 520. The training engine can use any of a variety of tokenization processes, with delimiters corresponding to the scripting language. For example, delimiters between tokens can be white space, and tokens from comments may be ignored or included.

The training engine, for each training script, generates a respective integer vector of the training script including a plurality of elements, each element corresponding to a number of occurrences of respective one or more tokens or hashed tokens in the training script, according to block 530. An integer vector includes integer-valued elements. In some examples, the training engine hashes each token using a locality-sensitive hashing function (LSH). An LSH function can generate a family of hash values from input, such as a set of tokens. Unlike other types of hash functions where hash collision is not desired, LSH functions differ in that collisions may occur according to a predetermined probability. By processing the tokens through an LSH function, the elements for an integer vector can be indexed by LSH values of the training script. Tokens which end up colliding in hash value when processed by the training engine contribute to the value of the element indexed by the LSH value. In this way, "similar" tokens are grouped together along elements of the integer vector, for each training script. In other examples, other types of hashing tokenizers are used to generate the integer vectors for the training scripts.

The training engine generates a map between the generated integer vectors and a plurality of binary vectors, the map based on projecting the generated vectors into a dimension lower than a dimension for the generated vectors, while preserving similarity when the generated vectors are compared using a distance function, according to block 540. The binary vectors may have a predetermined length, such as 40 elements long, and each element may be zero or one. Integer vectors within a predetermined similarity threshold are mapped to the same binary vector, and each binary vector can be mapped to one or more integer vectors. The distance function can be, for example, a cosine distance function or a variant of the cosine distance function defined over the vector space in which the integer vectors occupy. The "similarity" between vectors is measured by the distance between the vectors in their corresponding vector space.

The training engine generates one or more groups of connected binary vectors, according to block 550. Two binary vectors are connected if their respective coordinates in the binary vector space they share are adjacent to one another. Generally, if a first binary vector is connected to a second binary vector, and the second binary vector is connected to a third binary vector, then the first, second, and third binary vectors will be part of the same group. In other words, the binary vectors at least partially form a connected component in the binary vector space.

Generating groups of connected binary vectors as described herein can cause training scripts mapped to those binary vectors through their respective integer vector representations to be more accurately grouped together by similarity. In previous approaches, binary vectors mapped from respective integer vectors are converted into an integer value, and compared with other similarly converted integer values. This has the effect of creating cut-offs in similarity between training scripts, which would otherwise be grouped together. The process 500 as described herein addresses this shortcoming by not reducing the dimensionality of the binary vectors, instead identifying connected components within their binary vector space, indicative of similar training scripts.

To improve the resolution between the different groups, in some examples binary vectors mapped to only a single integer vector are removed, and the training engine identifies connected components from the remaining binary vectors. Removing the binary vectors mapped to single integer vectors has been observed to cause the resulting connected components from the remaining binary vectors to more accurately group similar training scripts, such as training scripts that may vary only by one token.

The training engine generates a training set, a validation set, and a testing set of training scripts, wherein for each group of binary vectors, training scripts corresponding to the group are either all in the training set, all in the validation set, or all in the testing set, according to block 560. In other words, all training scripts represented by integer vectors mapped to binary vectors in the same connected component are considered similar or identical to the point that spreading those training scripts across the various sets would result in data leakage. Instead, those training scripts are assigned to only one of the training, validation, and testing sets. As a result, when the classification machine learning model is trained, data leakage is reduced, which can improve model accuracy. Improving model accuracy directly improves the performance of the script detection system, at least in its function in identifying malicious scripts which would inhibit or harm the computing platform if left to execute unchecked.

The training engine can split the training scripts according to different distributions. For example the training engine can split approximately 60 percent of the script training data to the training set, approximately 20 percent of the script training data to the validation set, and approximately 20 percent of the script training data to the testing set. Other distributions are possible.

The training engine trains, validates, and tests a classification machine learning model to classify scripts using the generated training, validation, and testing set, according to block 570. The classification machine learning model can be, for example, the classification model 212 implemented as part of the classification engine 210, as described with reference to FIGS. 2-3. The training engine can train the classification machine learning model according to any of a variety of supervised training procedures, and with different learning parameters or hyperparameters. For example, the training engine can train the classification model with gradient descent, with a mini-batch size of 512 and a learning rate of 0.4. Other supervised learning processes include stochastic and batch gradient descent, among others, with different learning rates and other learning parameters.

Example Computing Environment

Figure 5:
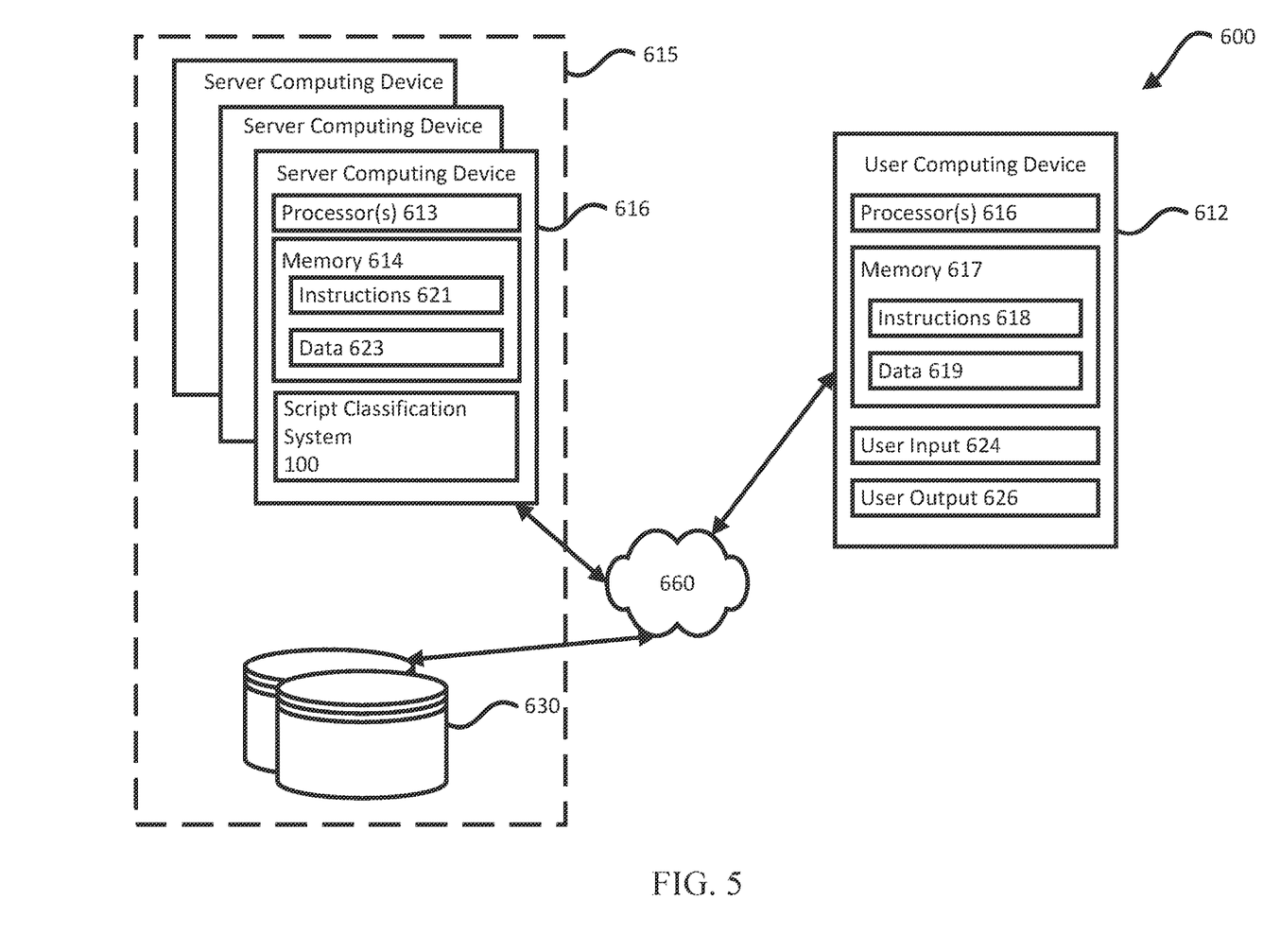
FIG. 5 is a block diagram of an example environment for implementing the script classification system.

FIG. 5 is a block diagram of an example environment 600 for implementing the script classification system 100. The system 100 can be implemented on one or more devices having one or more processors in one or more locations, such as in server computing devices 616. User computing device 612 and the server computing devices 616 can be communicatively coupled to one or more storage devices 630 over a network 660. The storage device(s) 630 can be a combination of volatile and non-volatile memory, and can be at the same or different physical locations than the computing devices 612, 616. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories. The storage device(s) 630 and the server computing devices 616 can make up at least part of a computing platform 615.

The server computing devices 616 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the system 100 consistent with aspects of this disclosure. The system 100 can be executed using the processor(s) 613, and/or using other processors remotely located from the server computing devices 616.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing devices 616, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing devices 616 can be configured to transmit data to the user computing device 612, and the user computing device 612 can be configured to display at least a portion of the received data on a display implemented as part of the user output 626. The user output 626 can also be used for displaying an interface between the user computing device 612 and the server computing devices 616. The user output 626 can alternatively or additionally include one or more speakers, transducers or other audio outputs, a haptic interface or other tactile feedback that provides non-visual and non-audible information to the platform user of the user computing device 612.

Although FIG. 5 illustrates the processors 613, 616 and the memories 614, 617 as being within the computing devices 616, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 616, 612 can each include one or more internal clocks providing timing information, which can be used for time measurement for operations and programs run by the computing devices 616, 612.

The server computing devices 616 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 616 can be capable of direct and indirect communication over the network 660. The devices 612, 616 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 616, including over various types of Ethernet connection.

It is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:
one or more processors in communication with a computing node of a computing platform, the one or more processors configured to:
receive a script from the computing node;
tokenize the script into a plurality of tokens;
generate the output classification of the script as benign or malicious to the computing platform, using a classification machine learning model trained to classify scripts; and
send the output classification to the computing node,
wherein the one or more processors are further configured to train the classification machine learning model, wherein in training the classification machine learning model, the one or more processors are configured to:
receive script training data comprising a plurality of training scripts;
tokenize the plurality of training scripts to generate a plurality of tokens;
for each training script, generate a respective integer vector of the training script comprising a plurality of elements, each element corresponding to a number of occurrences of respective one or more token or hashed tokens in the training script;
generate a map between the generated integer vectors and a plurality of binary vectors, each binary vector comprising a plurality of binary elements, the map based on projecting the generated vectors into a dimension lower than a dimension for the generated integer vectors, while preserving respective similarity between the generated integer vectors when the generated integer vectors are compared using a distance function;
generate one or more groups of connected binary vectors;
generate, using the one or more groups of connected binary vectors, a training set, a validation set, and a testing set of training scripts, wherein for each group of binary vectors, training scripts corresponding to the group are either all in the training set, all in the validation set, or all in the testing set; and
train the classification machine learning model to classify scripts using the generated training, validation, and testing sets, and
wherein in generating the training set, validation set, and the testing set, the one or more processors are configured to split:
approximately 60 percent of the script training data to the training set,
approximately 20 percent of the script training data to the validation set, and
approximately 20 percent of the script training data to the testing set.

* * * * *